Nov. 28, 1939.  C. J. GOGUEN ET AL  2,181,182
VENT PLUG TERMINAL
Filed Aug. 23, 1937
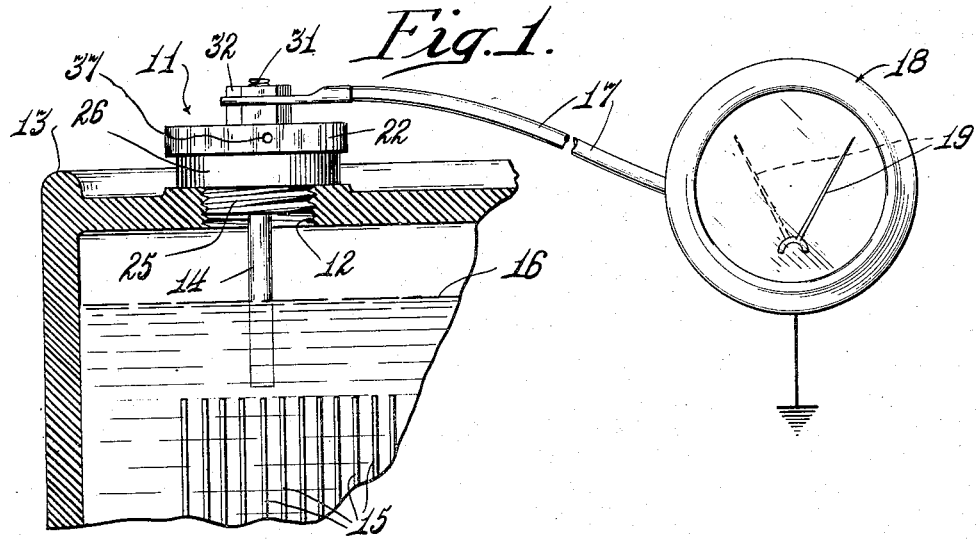
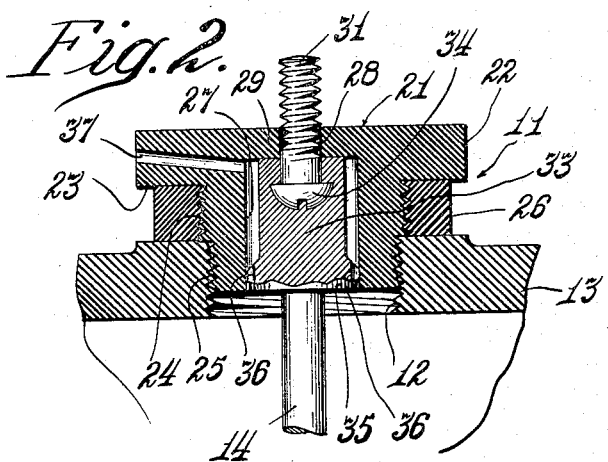
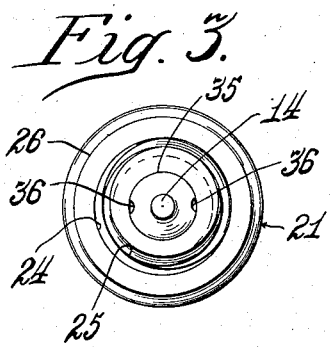
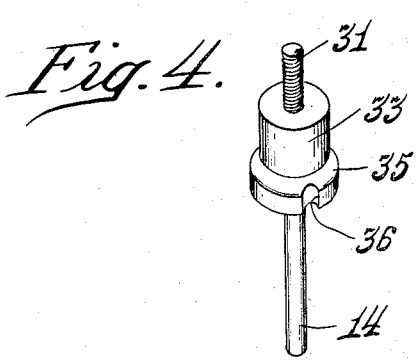
Inventors.
Charles J. Goguen,
and Samuel S. Stewart, Jr.
Daniel A Brennan
Attorney.

Patented Nov. 28, 1939

2,181,182

UNITED STATES PATENT OFFICE 2,181,182

VENT PLUG TERMINAL

Charles J. Goguen, Chicago, Ill., and Samuel S. Stewart, Jr., Flint, Mich.

Application August 23, 1937, Serial No. 160,462

2 Claims. (Cl. 136—182)

The invention relates to water level indicating devices and more particularly to an improved novelly constructed terminal vent plug or cap for a storage battery.

An object of the invention is to provide an inexpensive and novelly constructed terminal vent cap for a battery water level indicating device, which is easy to assemble.

Another object is to provide a terminal vent cap with novel means to prevent the escape of electrolyte.

Another object is to provide a vent cap with novel means to render it universally applicable to battery filling openings of different diameters and threads of different pitches.

Another object is to provide a vent cap terminal with novel means to co-act with the vent cap to prevent the escape of electrolyte through the vent opening in said plug.

The foregoing and such other objects of the invention as will appear hereinafter as the description proceeds will be more readily understood from a perusal of the following specification, reference being had to the accompanying drawing, in which:

Fig. 1 is a composite view showing a battery water level indicating instrument and its associated terminal vent cap, the storage battery being shown in section.

Fig. 2 is an enlarged vertical sectional view through the vent cap and terminal, shown mounted in a battery.

Fig. 3 is an inverted view of the terminal vent cap.

Fig. 4 is a perspective view of the terminal.

The terminal vent cap, indicated generally at 11, is adapted to be screwed into one of the vent openings 12 of a battery 13, with its depending terminal 14 stopping short of the battery plates 15. While the normal water level, substantially as indicated at 16, is maintained, the terminal 14 is partly immersed therein. This closes an electric circuit from the battery through terminal 14 and a lead 17 to an electrically actuated indicator instrument 18 which may be mounted upon a vehicle instrument board. This instrument does not constitute a part of the present invention but is fully described and claimed in Patent No. 1,995,207, issued March 19, 1935, to Charles J. Goguen. While the water is maintained substantially at the level indicated, the pointer 19 of the instrument 18 is held in the full line position shown. If the water level drops to a point below the end of terminal 14, the circuit is broken and said pointer moves into the dotted line position to indicate that water must be added to the battery.

As best shown in Fig. 2, the vent cap consists of a body 21, of suitable insulating material, such as hard rubber, externally flanged at one end, as at 22, to provide a sealing shoulder 23. The remaining body portion has its external periphery turned to two diameters 24 and 25, and is threaded, as shown, so that the vent cap may be readily screwed into either of several different size openings standard in most batteries now commercially available. When the vent cap is mounted in a battery having the larger of the several standard size openings, the threads 24 are engaged therewith and the shoulder 23 is brought tightly against the top of the battery to prevent leakage. When the vent cap is mounted in the smaller size opening, the threads 25 are engaged and, to prevent leakage, an internally threaded adapter ring is first screwed on the threads 24, as shown. This adapter ring provides a suitable shoulder for abutment with the top of the battery to prevent leakage.

A central recess 27 extends inwardly from the bottom face of the vent cap 21 and terminates a short distance from the flanged end of the body, leaving a relatively thin end wall 29. A hole 28 is provided in the end wall 29 to receive a threaded extension 31 provided on one end of the terminal 14. A grooved nut 32 secures the terminal in place and provides means to secure the lead 17 to said terminal. An enlarged portion 33 is formed adjacent one end of the terminal 14 into which is embedded the head 34 of the screw forming the threaded extension 31. An external circumferential flange 35, having substantially the same diameter as the diameter of recess 27, is provided adjacent one end of said enlarged portion. One or more grooves 36 are cut in the circumferential flange 35 to provide vent passages for the escape of battery gases, which pass into the space between the portion 33 of the terminal and the wall or recess 27 and then out through a radial vent 37.

It is obvious that the flange 35 provides an efficient baffle to prevent the electrolyte and water from passing out of the vent 37 and also provides a firm bearing surface to hold the terminal rigid within recess 27. Should some electrolyte be discharged through vent 37, while handling of the battery, it will not reach and corrode the terminal nut 32 due to the position of said vent.

It should be understood that the description and the disclosures in the drawing are exemplary of one embodiment of the invention and that the various terms used herein are descriptive rather than restrictive.

We claim:

1. A terminal vent cap comprising, in combination, a body having a threaded external periphery of two different diameters and a central recess of uniform diameter extending inwardly from its bottom face, an adapter ring screwed onto the larger of said threaded diameters, a terminal, an enlarged portion at one end of said terminal having a diameter slightly smaller than that of the recess insertable in said recess, a screw having its head embedded in said enlarged portion providing a threaded extension on said terminal, said extension extending through an opening in said body at the end of said recess, a flange integral with the lower end of said enlarged portion of a size to fit snugly in the open end of said recess, the upper face of said flange being inclined downwardly outwardly, vent grooves in the periphery of said flange, and a radial vent in said body.

2. A terminal vent cap comprising, in combination, a body having a threaded external periphery of two different diameters and a central recess of uniform diameter extending inwardly from its bottom face, an adapter ring screwed onto the larger of said threaded diameters, a terminal, an enlarged portion at one end of said terminal having a diameter slightly smaller than that of the recess insertable in said recess, a screw having its head embedded in said enlarged portion providing a threaded extension on said terminal, said extension extending through an opening in said body at the end of said recess, a flange integral with the lower end of said enlarged portion of a size to fit snugly in the open end of said recess, vent grooves in the periphery of said flange, and a radial vent in said body.

CHARLES J. GOGUEN.
SAMUEL S. STEWART, JR.